United States Patent
Pfluger

(10) Patent No.: US 11,933,687 B2
(45) Date of Patent: Mar. 19, 2024

(54) DEVICE FOR DETECTING A RAIL LOAD AND METHOD FOR MOUNTING SUCH DEVICE IN A RAIL

(71) Applicant: KISTLER HOLDING AG, Winterthur (CH)

(72) Inventor: Kim Pfluger, Winterthur (CH)

(73) Assignee: KISTLER HOLDING AG, Winterthur (CH)

(*) Notice: Subject to any disclaimer, the term of this patent is extended or adjusted under 35 U.S.C. 154(b) by 353 days.

(21) Appl. No.: 17/425,445

(22) PCT Filed: Jan. 20, 2020

(86) PCT No.: PCT/EP2020/051209
§ 371 (c)(1),
(2) Date: Jul. 23, 2021

(87) PCT Pub. No.: WO2020/156845
PCT Pub. Date: Aug. 6, 2020

(65) Prior Publication Data
US 2022/0097740 A1    Mar. 31, 2022

(30) Foreign Application Priority Data

Jan. 28, 2019   (EP) .................................... 19153963

(51) Int. Cl.
*G01L 5/00*   (2006.01)
*B61K 9/08*   (2006.01)
(Continued)

(52) U.S. Cl.
CPC .............. *G01L 5/0004* (2013.01); *B61K 9/08* (2013.01); *B61L 1/06* (2013.01); *G01L 1/16* (2013.01)

(58) Field of Classification Search
CPC ........... G01L 5/0004; G01L 1/16; B61K 9/08; G01M 5/0025
See application file for complete search history.

(56) References Cited

U.S. PATENT DOCUMENTS

| | | | |
|---|---|---|---|
| 3,234,777 A * | 2/1966 | Joy ...................... | G01G 19/047 73/146 |
| 4,200,856 A * | 4/1980 | Gilcher ..................... | G01P 3/66 246/249 |

(Continued)

FOREIGN PATENT DOCUMENTS

| | | | | |
|---|---|---|---|---|
| DE | 44 08 923 A1 | 9/1995 | | |
| DE | 4408923 A1 * | 9/1995 | ................ | B61L 1/06 |

(Continued)

OTHER PUBLICATIONS

PCT Search Report and Written Opinion, dated Apr. 17, 2020, 11 pages.

(Continued)

*Primary Examiner* — Francis C Gray
(74) *Attorney, Agent, or Firm* — Dority & Manning, P.A.

(57) ABSTRACT

A device for detecting a rail load fits into a bore of a rail and includes a sensor that generates a load signal under an action of the rail load caused when rail vehicles with wheels travel on the rail and the wheels exert a load onto the rail. The load signal is a measure for the rail load. The sensor includes at least one piezoelectric sensor element that generates electric polarization charges as the load signal.

20 Claims, 3 Drawing Sheets

(51) Int. Cl.
*B61L 1/06* (2006.01)
*G01L 1/16* (2006.01)

(56) References Cited

U.S. PATENT DOCUMENTS

| | | | | |
|---|---|---|---|---|
| 5,461,924 | A * | 10/1995 | Calderara | G01G 3/13 73/768 |
| 10,378,974 | B2 * | 8/2019 | Pfluger | G01G 19/024 |
| 10,782,178 | B2 * | 9/2020 | Pedrick | G01G 19/024 |
| 2006/0053904 | A1 * | 3/2006 | Sugiura | G01L 1/26 73/862.623 |
| 2007/0022818 | A1 * | 2/2007 | Sugiura | G01L 1/16 73/756 |
| 2014/0251700 | A1 * | 9/2014 | Cornu | G01G 19/02 177/136 |
| 2017/0160153 | A1 * | 6/2017 | Brunner | G01L 9/0042 |
| 2017/0315013 | A1 | 11/2017 | Takemoto et al. | |
| 2018/0128697 | A1 | 5/2018 | Groche et al. | |
| 2020/0339167 | A1 * | 10/2020 | Liu | G01M 5/0025 |
| 2021/0181040 | A1 * | 6/2021 | Pfluger | G01G 19/024 |

FOREIGN PATENT DOCUMENTS

| | | |
|---|---|---|
| DE | 195 18 123 C2 | 12/1996 |
| EP | 0 675 032 A1 | 10/1995 |

OTHER PUBLICATIONS

Chinese Office Action with Translation, dated Nov. 24, 2023, 16 pages.

* cited by examiner

DEVICE FOR DETECTING A RAIL LOAD AND METHOD FOR MOUNTING SUCH DEVICE IN A RAIL

CROSS-REFERENCE TO RELATED APPLICATIONS

The present application claims priority to International application serial No. PCT/EP2020/051209, which is hereby incorporated herein by this reference for all purposes.

FIELD OF THE INVENTION

The invention generally relates to the technical field of rail vehicles and particularly relates to a device for detecting a rail load exerted by a rail vehicle. The invention further relates to a method for mounting such device in a rail.

BACKGROUND OF THE INVENTION

Rail vehicles run on rails. Rail vehicles are widely used that run by means of wheels on a pair of parallel rails made of steel. These rail vehicles and rails must comply with safety rules. For this reason, a rail load is measured in order to detect abrasion of the wheels. Abraded wheels show wheel geometric irregularities as well as wheel flattening. Abraded wheels exert a higher rail load as compared to non-abraded wheels. The rail load comprises a static component such as a wheel contact force, and a dynamic component such as a wheel guiding force.

In this respect, DE19518123C2 discloses a load sensor for detecting the rail load. The load sensor is fitted into a bore of a rail. This bore is a transverse bore. The load sensor comprises an inner tube and an outer tube arranged coaxially with the inner tube. The outer tube separates into two tube halves. A glass fiber is embedded in an elastic mass between the inner tube and the tube halves. The glass fiber transmits light. The tube halves do not touch one another in the absence of a rail load. A rail load exerted by the rail vehicle deforms the elastic mass and the tube halves are moved towards one another changing a bending radius of the glass fiber and resulting in an attenuation of the light transmission within the glass fiber. This attenuation of the light transmission within the glass fiber is detected and evaluated as the load signal. The load signal provides a measure for the rail load.

A disadvantage with this load sensor according to DE19518123C2 is that the elasticity of the elastic mass strongly depends on temperature. A temperature of use of rails varies in a range of −40° C. to +70° C. The temperature of use has a strong impact on the deformation behavior of the elastic mass. Moreover, the elastic mass ages much more rapidly over time than the other components of the load sensor such as the glass fiber, the inner tube and the tube halves, and aging changes the deformation behavior of the elastic mass. The temperature dependence and the aging of the elastic mass lead to inaccuracy in detecting the rail load.

In addition, the teachings of DE19518123C2 are for a rail load in the order of 2 kN which is no longer sufficient to meet today's requirements; in fact modern high-speed rail vehicles exert a rail load in the order of up to 250 kN.

It is furthermore generally desired to bring a load sensor to the market having a service life which matches that of a rail, i.e. of at least ten years. This is because such load sensor will require no replacement during the service life of the rail. This excludes the use of strain gauges that are attached to a support by means of adhesive and that detect a deformation of the support as a change in electrical resistance. The life cycle of such adhesives is usually also less than the service life of a rail, i.e. of at least ten years.

It is further desired to detect the dynamic component of the rail load with high temporal resolution of up to 100 kHz.

Additionally, it is also desired to be able to mount the load sensor on the rail at low cost.

OBJECTS AND SUMMARY OF THE INVENTION

It is a first object of the present invention to provide a device for detecting a rail load exerted by a rail vehicle wherein said device detects the rail load with high accuracy. It is a second object of the invention to provide a device designed for detecting a high rail load. It is a third object of the invention to provide such device having a service life matching that of the rail. It is a fourth object of the invention to detect a static—and a dynamic component of the rail load with high temporal resolution. And a fifth object is that it must be possible to mount the device on the rail at low cost.

At least one of these objects is achieved by the features described below.

The invention relates to a device for detecting a rail load; which device can be fitted into a bore of a rail; wherein rail vehicles having wheels travel on said rail, said wheels exerting a load onto the rail; wherein said device comprises a sensor, which sensor generates a load signal under an impact of the rail load, said load signal being a measure for the rail load; and wherein said sensor comprises at least one piezoelectric sensor element, said piezoelectric sensor element generating electric polarization charges as the load signal.

It has been shown that the piezoelectric sensor element detects with high accuracy a rail load acting onto the rail in the form of a force, a moment or an acceleration. The reason is that the piezoelectric sensor element generates electric polarization charges under the impact of the rail load. Furthermore, a quantity of the electric polarization charges generated is proportional to the rail load. This proportionality between the amount of electric polarization charges generated and the rail load B is highly constant over the entire range from −40° C. to +70° C. of rail operating temperatures and is practically temperature-independent. Furthermore, the piezoelectric material has high mechanical strength and shows almost no aging during a service life of the rail, i.e. for at least ten years. Moreover, the piezoelectric sensor element detects the dynamic component of the rail load with high temporal resolution of up to 100 kHz.

The invention further relates to a method of mounting the device for detecting a rail load in a rail wherein a bore with a bore radius is made in the rail; wherein a device is used that comprises a sensor housing, in which sensor housing is arranged at least one piezoelectric sensor element, wherein under the action of the rail load said piezoelectric sensor element generates electric polarization charges that serve as the load signal, said sensor housing being delimited by a lateral surface, wherein said lateral surface has an oversize in at least one peripheral surface area with respect to the bore radius; and wherein the device having said oversize in the peripheral surface area is fitted into the bore creating a form-fit and force-fit connection.

Such mounting can be achieved at low cost. A bore with a bore radius can be easily and quickly fabricated in the rail and even in a rail that is already installed in a rail network by means of tools that are well-known and generally available. And furthermore, the form and force-fit connection between the device with said oversize in the peripheral surface area of its lateral surface and the bore can be achieved in a simple and quick manner using well-known and generally available tools.

BRIEF DESCRIPTION OF THE DRAWINGS

In the following, the invention will be explained in more detail by way of example with reference to the figures in which.

DETAILED DESCRIPTION OF EXEMPLARY EMBODIMENTS OF THE INVENTION

Figure 1:
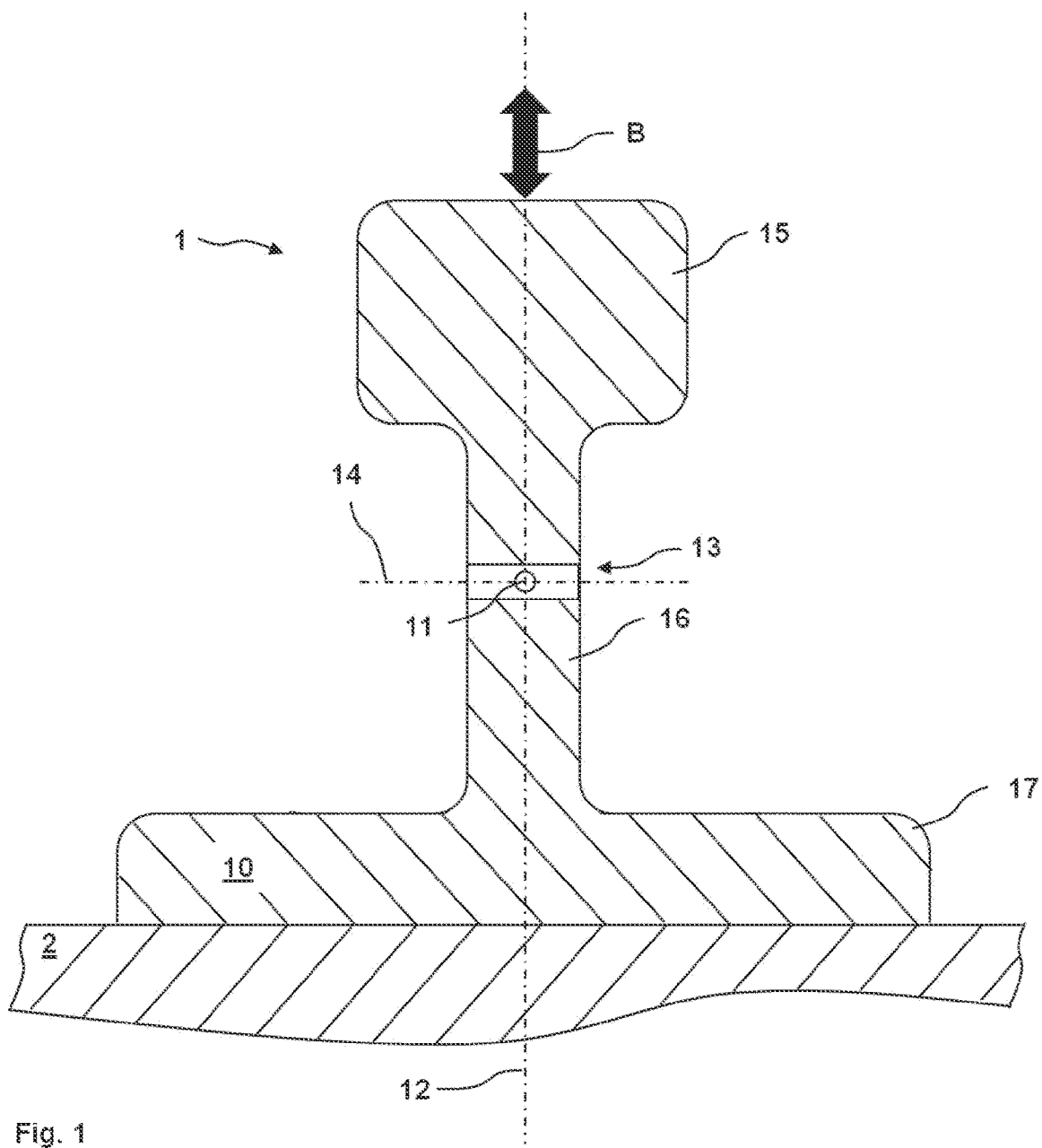
FIG. 1 shows a sectional view through a portion of an embodiment of a rail with a bore for accommodating a device for detecting a rail load.

FIG. 1 shows a sectional view of a portion of an embodiment of a rail 1. Rail 1 comprises a rail body 10 made of mechanically resistant materials such as iron, iron alloys, steel, etc. The rail body 10 is made in a unitary construction, i.e., in one piece. Rail 1 has a length of several meters along a longitudinal axis 11 thereof, which is normal to the plane of FIG. 1. Rail 1 has a height of several centimeters along a vertical axis 12 thereof. Rail 1 has a width of several centimeters along a transverse axis 14 thereof. These three axes, the longitudinal axis 11, vertical axis 12 and transverse axis 14, are perpendicular to each other. The longitudinal axis 11 and transverse axis 14 form a horizontal plane. The longitudinal axis 11 and vertical axis 12 form a vertical plane. Rail 1 is defined by differently shaped sections, each section being defined by a recognizable geometry, and accordingly rail 1 comprises a head 15, a web 16 and a foot 17. By means of the foot 17, rail 1 is mechanically fastened to a sleeper 2. Web 16 mechanically connects the head 15 and the foot 17 of the rail 1 along the vertical axis 12. A width of web 16 along the transverse axis 14 is narrower than a width of the head 15 or the foot 17. Those skilled in the art knowing the present invention may also devise other embodiments of a rail. Thus, the head, web and foot of the rail may be dimensioned differently with respect to each other, for example. Furthermore, the rail may have smaller or larger dimensions in the length, width and height directions.

Rail 1 is installed in a rail network. Rail vehicles travel in said rail network but are not shown in the figure. The rail vehicles may be a train, a tram, an underground railroad vehicle, etc. The rail vehicles travel on the rail 1 by wheels, which wheels are also not shown in the figure. The wheels exert a rail load B onto the head 15 of the rail 1. The rail load B is shown schematically as a double headed arrow in FIG. 1 and FIG. 3. The rail load B may be forces, moments and accelerations (vibrations). The rail load B has a static component and a dynamic component. The static component may be a wheel contact force (weight) of the rail vehicles. The wheel contact force acts along the vertical axis 12 of the rail 1. The dynamic component may be a wheel guiding force of the rail vehicles. The wheel guiding force acts along the vertical axis 12 and acts in the horizontal plane that is defined by the longitudinal axis 11 and the transverse axis 14.

Figure 2:
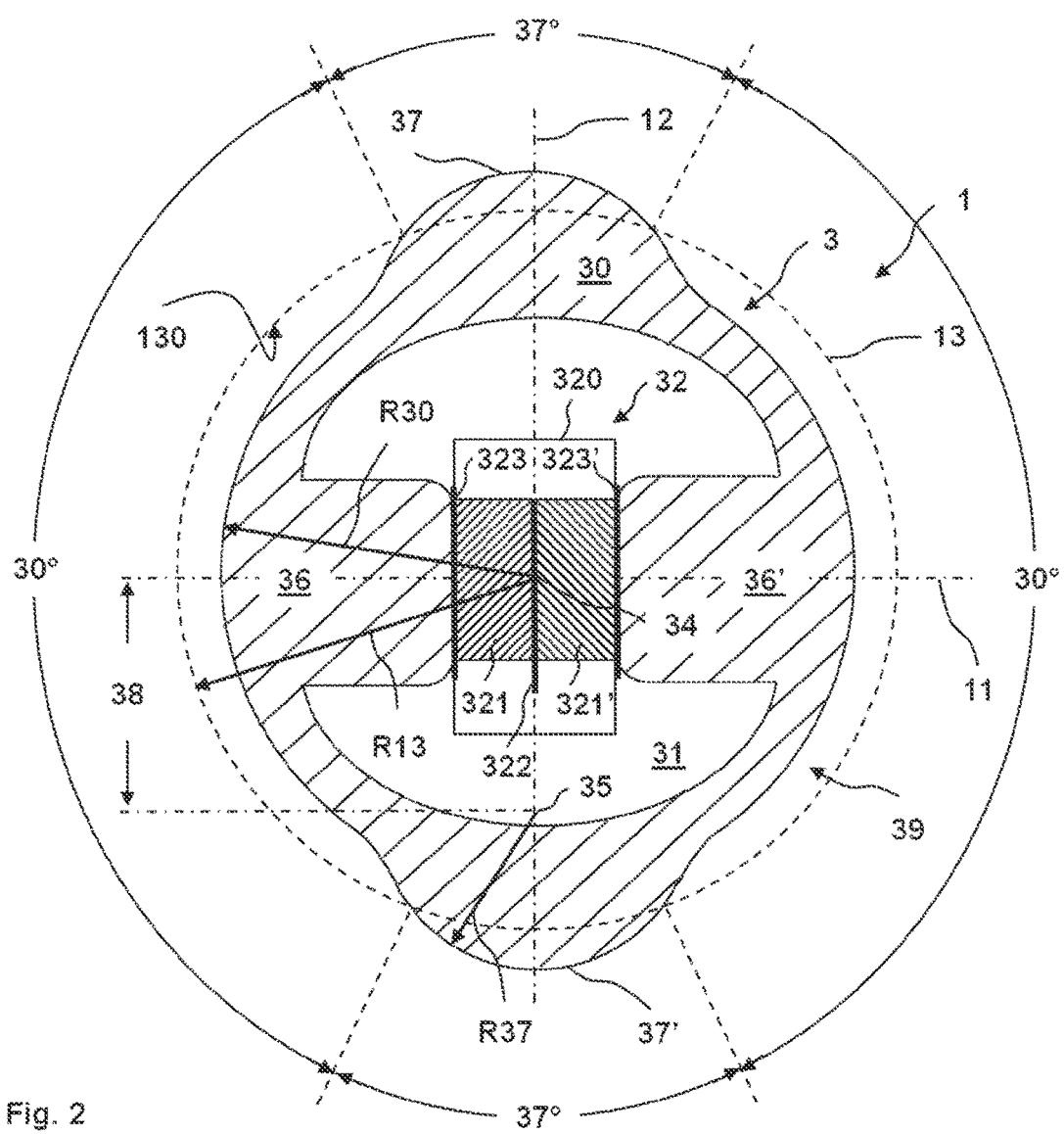
FIG. 2 shows a sectional view through a portion of an embodiment of the device for detecting the rail load prior to mounting in the bore of the rail according to FIG. 1.
Figure 3:
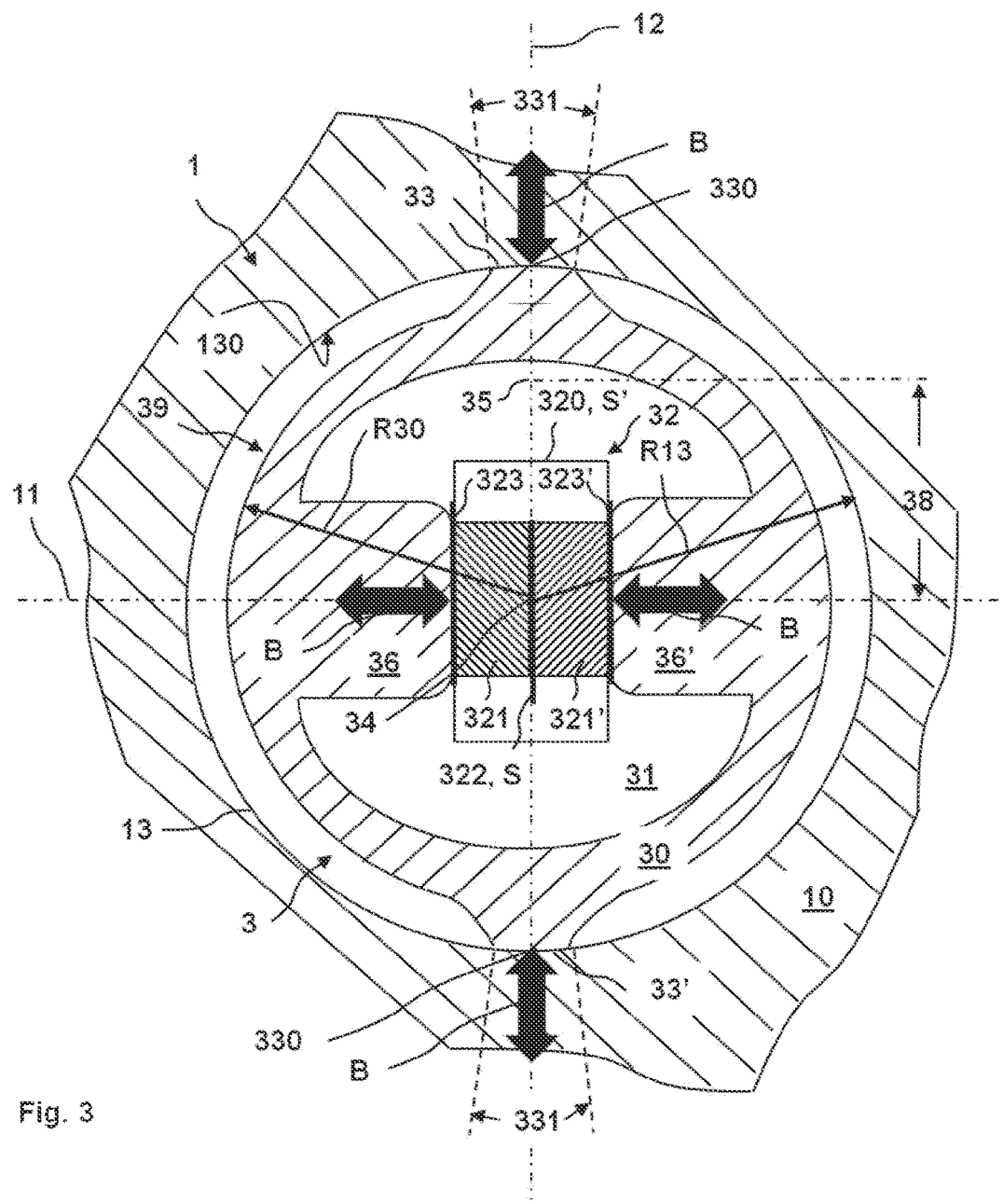
FIG. 3 shows a sectional view through the portion of the embodiment of the device according to FIG. 2 after mounting in the bore of the rail according to FIG. 1.

Rail 1 comprises a bore 13. The bore 13 may be provided in the web 16 of the rail 1. Preferably, the bore 13 is arranged in a neutral fiber of the rail 1. The rail load B causes no change in length of the rail 1 along the longitudinal axis 11 in the neutral fiber. Thus, the impact of the rail load B causes no deformation of the rail 1 in the neutral fiber. Therefore, no absorption of a portion of the rail load B by the rail 1 which would interfere with the detection of the rail load B, occurs in the neutral fiber. The bore 13 may be a transverse bore along the transverse axis 14. The bore 13 may be a blind hole or a through hole. The bore 13 may have the form of a circular cylinder having a length of 15 millimeters along the transverse axis 14 and a bore radius R13 of 12.50 millimeters in the direction perpendicular to the transverse axis 14. The bore radius R13 is shown in FIGS. 2 and 3. The bore radius R13 is an inner radius. The bore radius R13 delimits an inner surface 130 of the bore 13. Preferably, the bore 13 is fabricated with a tolerance of 0.08 millimeters. Drilling a bore 13 with this tolerance on a rail 1 already installed in the rail network is inexpensive and can be performed easily and quickly by means of tools that are well-known and generally available.

Those skilled in the art knowing the present invention may also provide the bore in the head or foot of the rail. Furthermore, those skilled in the art may fabricate a bore that is shorter or longer in length or has a smaller or larger bore radius.

A device 3 according to the invention for detecting the rail load B may be fitted into the bore 13. One embodiment of said device 3 is shown in FIGS. 2 and 3. Device 3 comprises a sensor housing 30. The sensor housing 30 is made of mechanically resistant material such as pure metals, nickel alloys, cobalt alloys, iron alloys, etc.

The sensor housing 30 substantially has the form of a hollow cylinder with a center 34, a height, and a lateral surface 39. For the purposes of the invention, the adverb "substantially" is intended to mean a variation of +1-10% of a feature the adverb refers to. Thus, the feature in question being a form, this form may vary from the perfect form by +1-10%. The lateral surface 39 extends in the vertical plane in a circumferential direction. The lateral surface 39 is an outer surface of the sensor housing 30. The sensor housing 30 substantially may have a height of 15 millimeters along the transverse axis 14. The dimensions of the sensor housing 30 are different along the vertical axis 12 and along the longitudinal axis 11. A dimension of the sensor housing 30 along the vertical axis 12 is larger than its dimension along the longitudinal axis 11. Preferably, a difference between a larger dimension of the sensor housing 30 along the vertical axis 12 and a smaller dimension of the sensor housing 30 along the longitudinal axis 11 is in a range of 5% to 20%. Those skilled in the art and aware of the present invention may provide a sensor housing with a smaller or larger height or with a smaller or larger difference in dimensions.

The sensor housing 30 has two curvatures 37, 37' in the direction of the vertical axis 12. Preferably, the radius of curvature R37 of the lateral surface 39 along the vertical axis 12 is substantially smaller than half the bore radius R13. The radius of curvature R37 may be substantially 6.0 millimeters. The radius of curvature R37 is measured from an offset point 35. Said offset point 35 is offset from the center 34 along the vertical axis 12 by a distance 38. Preferably, this distance 38 is substantially larger than half the bore radius R13. The distance 38 may be substantially 6.6 millimeters. The radius of curvature R37 delimits the lateral surface 39 in the direction of the vertical axis 12. Thus, sensor housing 30 has a larger dimension in the direction of the vertical axis 12, which dimension as schematically shown in FIG. 2 is equal to the sum of the radius of curvature R37 and said distance 38. Preferably, a peripheral surface arc 37° of the lateral surface 39 that has said larger dimension is substantially 30°. The peripheral surface arc 37° of the lateral surface 39 with said larger dimension is composed of two partial peripheral surface arcs of substantially 15° for each of the two curvatures 37, 37'.

The sensor housing 30 has a smaller dimension along the longitudinal axis 11, and that smaller dimension of the sensor housing along the longitudinal axis 11 is equal to twice the housing radius R30. Preferably, the housing radius R30 is substantially smaller than the bore radius R13. The housing radius R30 is substantially 11.0 millimeters. The housing radius R30 is measured from the center 34. The housing radius R30 delimits the lateral surface 39 along the longitudinal axis 11. Preferably, as schematically shown in FIG. 2, a peripheral surface arc 30° of the lateral surface 39 that has the smaller dimension is substantially 330°. The peripheral surface arc 30° of the lateral surface 39 with the smaller dimension is composed of two partial peripheral surface arcs of substantially 165° between each of the two curvatures 37, 37'.

In transition regions, the lateral surface 39 continuously transitions from the larger dimension in the direction of the vertical axis 12 to the smaller dimension in the direction of the longitudinal axis 11.

As shown in FIG. 2, the housing radius R30 is smaller than the bore radius R13 while the sum of the radius of curvature R37 and the distance 38 is larger than the bore radius R13. Thus, sensor housing 30 has an oversize with respect to the bore radius R13 in the peripheral surface arc 37° of the lateral surface 39 that has the larger dimension while the sensor housing 30 has an undersize with respect to the bore radius R13 in the peripheral surface arc 30° of the lateral surface 39 with the smaller dimension.

As shown in FIG. 3, a form- and force-fit connection is created between the device 3 and the bore 13 by deforming and displacing the oversize in the peripheral surface arc 37° of the lateral surface 39 with the larger dimension. The fact that the radius of curvature R37 is substantially less than half the bore radius R13 and the peripheral surface arc 37° of the lateral surface 39 with the larger dimension extends substantially over twice an angle of 15° achieves an amount of oversize that is appropriate for the material used. With a larger radius of curvature and particularly with a radius of curvature of substantially the same size as the bore radius the oversize would contain too much material. Also in the case of a peripheral surface arc 37° of the lateral surface 39 with the larger dimension extending over considerably more than twice the angle of 15° the oversize would contain too much material. The oversize that is sized in accordance with the material used is easily and quickly deformed and displaced by means of tools that are well-known and generally available.

In the peripheral surface arc 37° of the lateral surface 39 with the larger dimension, the device 3 is preferably fitted into the bore 13 by two form- and force-fit connections 33, 33'. After the connections are created, the sensor housing 30 and the rail body 10 are mechanically connected to one another by two form- and force-fit connections 33, 33'.

For a sensor housing 30 with infinite stiffness and a rail body 10 with infinite stiffness, the two form- and force-fit connections 33, 33' each form a line contact 330. The line contact 330 is on the vertical axis 12 and extends along the transverse axis 14.

However, in reality the stiffnesses of the materials of the sensor housing 30 and the rail body 10 are finite. For a sensor housing 30 with finite stiffness and a rail body 10 with finite stiffness, the two form- and force-fit connections 33, 33' each form a surface contact 331. The surface contact 331 extends between the lateral surface 39 and the inner surface 130 of the bore 13. The surface contact 331 along the transverse axis 14. In the circumferential direction of the lateral surface 39, the surface contact 331 extends over an arc of 1° to 5° of the peripheral surface. With a bore radius R13 of 12.50 millimeters, the surface contact 331 extends in the circumferential direction of the lateral surface 331 over a length of 0.2 millimeters to 1.0 millimeters of the peripheral surface. The sensor housing 30 and the rail body 10 that are in surface contact 331 with one another have a contact stiffness. Under the impact of the rail load B the contact stiffness is defined uniform. The defined uniform contact stiffness ensures that the rail load B is transferred with high accuracy, i.e. with equal proportionality, in a wide range from 100 N to 250 kN.

The device 3 has a cavity 31 in the sensor housing 30. In this cavity 31 is arranged a sensor 32. Sensor 32 comprises a sensor element housing 320, at least one piezoelectric sensor element 321, 321' and at least one electrode 322.

The sensor 32 is held by two holding members 36, 36'. Holding members 36, 36' are made integrally with the sensor housing 30 and desirably as a unitary structure as schematically shown in FIG. 2 for example. The holding members 36, 36' extend toward the center 34 along the vertical axis 12. Each holding member 36, 36' terminates in an end face. The end faces hold the sensor 32 in the center 34 within the horizontal plane.

The sensor element housing 320 is fabricated from mechanically resistant material such as pure metals, nickel alloys, cobalt alloys, iron alloys, etc. The sensor element housing 320 substantially has the form of a hollow cylinder. A center of the sensor element housing 320 desirably is disposed so that it coincides with the center 34 of the sensor housing 30 as schematically shown in FIG. 2. The sensor element housing 320 encloses and tightly seals the piezoelectric sensor element 321, 321' and the electrode 322. The sensor element housing 320 protects the piezoelectric sensor element 321, 321' and the electrode 322 from external influences that would interfere with the detection of the rail load B, such as water, oil, electromagnetic radiation, etc. However, those skilled in the art and aware of the present invention may also use a sensor without a sensor element housing, and in this alternative embodiment that is not shown in the figures, the piezoelectric sensor element 321, 321' and the electrode 322 would be supported by the holding members 36, 36'.

The sensor element housing 320 may be electrically insulated from the sensor housing 30. Preferably, the sensor element housing 320 is electrically insulated from the sensor housing 30 by an insulation layer 323, 323'. The insulation layer 323, 323' may be applied to the outside of the sensor element housing 320. The insulation layer 323, 323' is made of electrically insulating and mechanically rigid material such as ceramics, $Al_2O_3$ ceramics, sapphire, etc. By electrically insulating the sensor element housing 320 from the sensor housing 30 and the rail 1, the detection of the rail load B will be independent of a ground potential of the rail 1. In particular, electric currents will be inhibited from flowing from the rail 1 to the electric polarization charges generated by the piezoelectric sensing element under the action of the rail load B and from interfering with the detection of the rail load B.

The piezoelectric sensor element 321, 321' has the form of a cylinder and is made of piezoelectric material such as quartz ($SiO_2$ single crystal), calcium gallo-germanate ($Ca_3Ga_2Ge_4O_{14}$ or CGG), langasite ($La_3Ga_5SiO_{14}$ or LGS), tourmaline, gallium orthophosphate, piezoceramics, etc. As schematically shown in FIG. 2, in this particular embodiment, the axis of rotation of each cylindrically shaped piezoelectric sensor element 321, 321' can lie along the longitudinal axis 11 and passes through the center 34 of the sensor housing 30. The piezoelectric sensor element 321, 321' is cut in a crystallographic orientation that confers high sensitivity for the rail load B to be detected. The sensitivity is the ratio of the amount of a load signal S, S' generated by the piezoelectric sensor element 321, 321' and the amount of the rail load B acting. A quantity of electric polarization charges generated is proportional to the rail load B. Surfaces of the piezoelectric sensor element 321, 321' are in electric contact with surfaces of the electrode 322 and the sensor element housing 320 in the horizontal plane. Electric polarization charges generated on the surfaces of the piezoelectric sensor element 321, 321' are picked up by the electrode 322 and the sensor element housing 320 as the load signal S, Sr. Preferably, negative polarization electric charges are tapped by the electrode 322 as a first load signal S, while positive polarization electric charges are tapped by the sensor element housing 320 as a second load signal S'. The dynamic component of the rail load B is detected as the load signal S, S' with a high temporal resolution of up to 100 kHz.

The piezoelectric material may be cut into discs for obtaining the piezoelectric longitudinal effect in an orientation that when the rail load B to be detected acts on surfaces of the piezoelectric sensor element 321, 321' that lie in the horizontal plane, electric polarization charges are generated on these surfaces. However, the piezoelectric material may also be cut into discs for obtaining the piezoelectric shear effect in an orientation that when the rail load B to be detected acts on surfaces of the piezoelectric sensor element 321, 321' that lie in the horizontal plane, electric polarization charges are generated on these surfaces. Furthermore, the piezoelectric material may also be cut into bars for obtaining the piezoelectric transverse effect in an orientation that when the rail load B to be detected acts on surfaces of the piezoelectric sensor element 321, 321' that lie in the horizontal plane, electric polarization charges are generated on lateral surfaces of the piezoelectric sensor element 321, 321' that are perpendicular to these surfaces. Thus, those skilled in the art knowing the present invention may provide a device comprising a plurality of piezoelectric sensor elements for different piezoelectric effects such as the piezoelectric longitudinal effect, the piezoelectric shear effect, and the piezoelectric transverse effect.

In the embodiment according to FIGS. 2 and 3, the sensor 32 comprises two piezoelectric sensor elements 321, 321. The electrode 33 is arranged between the two piezoelectric sensor elements 32, 32'. This achieves a twofold increase in the amount of electric polarization charges generated under the action of the rail load B to be detected and a twofold increase in sensitivity of the device 3. Those skilled in the art knowing the present invention may provide a sensor with more than two piezoelectric sensor elements along with additional electrodes commensurate with the number of additional piezoelectric sensor elements.

Only a small fraction of the rail load B acting onto the head 15 of the rail 1 will also act onto the device 3. A major fraction of the rail load B acting onto the head 15 of the rail 1 acts from the head 15 of the rail 1 over the web 16 of the rail 1 onto the foot 17 of the rail 1 and from the foot 17 of the rail 1 onto the sleeper 2. As shown in FIG. 3, the small fraction of the rail load B acts via the rail body 10 along the vertical axis 12 onto the two form- and force-fit connections in the peripheral surface arc 37° of the lateral surface 39 with the larger dimension onto the sensor housing 30. An even smaller fraction of the rail load B acts from the sensor housing 30 along the longitudinal axis 11 over the two holding members 36, 36' onto the sensor 32 comprising the piezoelectric sensor element 321, 321. This even smaller fraction of the rail load B that acts onto the piezoelectric sensor element 321, 321' is proportional to the rail load B acting on the head 15 of the rail 1. Thus, since only an even smaller part of the rail load B acts onto the piezoelectric sensor element 321, 321', the device 3 is configured for the detection a high rail load B of up to 250 kN.

The load signal S, S' may be transmitted to an evaluation unit by means of an electric line. This electric line and this evaluation unit are not shown. The load signal S, S' may be electrically amplified and digitized by the evaluation unit. The evaluation unit may display the load signal S, S' as a measure of the rail load B.

The sensor 32 may be held under mechanical preload by the holding members 36, 36'. The mechanical preload mechanically preloads the surfaces of the piezoelectric sensor element 321, 321, the electrode 322 and the sensor element housing 320 lying in the horizontal plane against each other in such a way that electrically non-contacted areas with locally high electric voltages and electric leakage currents are avoided. Furthermore, the mechanical preload mechanically preloads the surfaces of the piezoelectric sensor element 321, 321, the electrode 322 and the sensor element housing 320 in such a way that roughnesses and unevennesses of these surfaces are sealed against each other resulting in excellent linearity of the device 3. The linearity indicates how constantly the amount of the electric polarization charges generated increases with an increase in rail load B. The device 3 is able to detect a rail load B over a wide range from 100 N to 250 kN. The mechanical preload may be adjusted by means of clamping means such as at least one screw, a wedge, etc. The clamping means are not shown in the figures.

LIST OF REFERENCE NUMERALS 1 rail
2 sleeper
3 device
10 rail body
11 longitudinal axis
12 vertical axis
12 bore
130 inner surface
14 transverse axis
15 head
16 web
17 foot
30 sensor housing
30° peripheral surface area with smaller dimension
31 cavity
32 sensor
33, 33' form- and force-fit connection
330 line contact
331 surface contact
34 center
35 offset point
36, 36' holding member
37, 37' curvature 37° peripheral surface area with larger dimension
38 distance
39 lateral surface
320 sensor element housing
321, 321' piezoelectric sensor element
322 electrode
323, 323' insulation layer
B rail load
R13 bore radius
R30 housing radius
R37 radius of curvature
S, S' load signal

The invention claimed is:

1. A device that can be fitted into a bore of a rail on which travel rail vehicles with wheels exerting a load onto the rail; the device comprising: a sensor that generates a load signal under the action of the rail load, which load signal is a measure for the rail load; wherein the sensor comprises at least one piezoelectric sensor element that generates electric polarization charges as the load signal.

2. The device according to claim 1, further comprising a sensor housing that defines a cavity within which the sensor is arranged.

3. The device according to claim 2, further comprising two holding members, wherein a center of the sensor housing is disposed in the cavity (31); wherein each of the two holding members extends toward the center of the sensor housing and is made integrally with the sensor housing (30); and wherein the two holding members hold the sensor.

4. The device according to claim 3, further comprising an electrode, wherein the piezoelectric sensor element defines surfaces that are in electrical contact with surfaces of the electrode (322); and wherein the electrode is configured and disposed to pick up the electric polarization charges as the load signal.

5. The device according to claim 4, wherein the two holding members mechanically preload the sensor element against the electrode.

6. The device according to claim 3, wherein the sensor housing is delimited by a lateral surface; and wherein said lateral surface has an oversize with respect to a bore radius of the bore in a first peripheral surface arc that has a larger dimension.

7. The device according to claim 6, further comprising two form- and force-fit connections, wherein said oversize can be fitted into the bore of the rail by the two form- and force-fit connections in the first peripheral surface arc of the lateral surface with the larger dimension.

8. The device according to claim 6, wherein the lateral surface in the first peripheral surface arc with the larger dimension has two curvatures with a radius of curvature; and wherein the radius of curvature is substantially less than half the bore radius.

9. The device according to claim 8, wherein the radius of curvature is measured from an offset point that is offset from the center by a predetermined distance.

10. The device according to claim 6, wherein the lateral surface has an undersize with respect to the bore radius in a second peripheral surface arc that has a smaller dimension; wherein the lateral surface has a housing radius in the peripheral surface arc with the smaller dimension; and wherein the housing radius is smaller than the bore radius.

11. The device according to claim 10, wherein the sensor is held by the two holding members so that when only a small fraction of the rail load (B) is acting onto a head of the rail, then the small fraction of the rail load acts from a rail body along the rail via the two form- and force-fit connections onto the sensor housing and wherein an even smaller fraction of the rail load acts from the sensor housing via the two holding members onto the sensor.

12. A method for mounting a device for detecting a rail load in a rail, the method comprising the following steps:
fabricating a bore with a bore radius in the rail (1);
inserting into the bore a device having a sensor housing in which is arranged at least one piezoelectric sensor element wherein under an action of the rail load said piezoelectric sensor element generates electric polarization charges as the load signal, wherein said sensor housing is delimited by a lateral surface that has an oversize with respect to the bore radius in a first peripheral surface arc that has a larger dimension; and wherein the step of inserting the device with the sensor housing having said oversize includes creating a form- and force-fit connection between the sensor housing and the bore.

13. The method according to claim 12, wherein the bore is fabricated with a tolerance of 0.08 millimeter.

14. The method according to claim 12, wherein the device having the oversize is fitted into the bore of the rail by two form- and force-fit connections in the peripheral surface arc of the lateral surface with the larger dimension, wherein for a sensor housing with infinite rigidity and a rail body with infinite rigidity each of the two form- and force-fit connections forms a line contact.

15. The method according to claim 12, wherein the device having the oversize is fitted into the bore of the rail by two form- and force-fit connections in the peripheral surface arc of the lateral surface with the larger dimension, wherein for a sensor housing with finite rigidity and a rail body with finite rigidity each of the two form- and force-fit connections forms a surface contact.

16. The device according to claim 4, wherein the sensor housing is delimited by a lateral surface, and wherein said lateral surface has an oversize with respect to a bore radius of the bore in a first peripheral surface arc that has a larger dimension.

17. The device according to claim 16, further comprising two form- and force-fit connections, wherein said oversize can be fitted into the bore of the rail by the two form- and force-fit connections in the first peripheral surface arc of the lateral surface with the larger dimension.

18. The device according to claim 17, wherein the lateral surface in the first peripheral surface arc with the larger dimension has two curvatures with a radius of curvature; and wherein the radius of curvature is substantially less than half the bore radius.

19. The device according to claim 5, wherein the sensor housing is delimited by a lateral surface, and wherein said lateral surface has an oversize with respect to a bore radius of the bore in a first peripheral surface arc that has a larger dimension.

20. The device according to claim 19, further comprising two form- and force-fit connections, wherein said oversize can be fitted into the bore of the rail by the two form- and force-fit connections in the first peripheral surface arc of the lateral surface with the larger dimension.

* * * * *